US010015595B2

United States Patent
Lee

(10) Patent No.: US 10,015,595 B2
(45) Date of Patent: Jul. 3, 2018

(54) METHOD AND APPARATUS FOR CONTROLLING SOUND SYSTEM INCLUDED IN AT LEAST ONE VEHICLE

(71) Applicant: Hyundai Motor Company, Seoul (KR)

(72) Inventor: Tae Ho Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/381,920

(22) Filed: Dec. 16, 2016

(65) Prior Publication Data
US 2018/0063640 A1    Mar. 1, 2018

(30) Foreign Application Priority Data
Aug. 26, 2016 (KR) ........................ 10-2016-0109379

(51) Int. Cl.
| | |
|---|---|
| *H04B 1/00* | (2006.01) |
| *H04R 3/12* | (2006.01) |
| *H04R 29/00* | (2006.01) |
| *B60Q 5/00* | (2006.01) |
| *B60R 16/037* | (2006.01) |
| *G01S 19/13* | (2010.01) |
| *H04R 5/04* | (2006.01) |

(52) U.S. Cl.
CPC ............ *H04R 3/12* (2013.01); *B60Q 5/006* (2013.01); *B60R 16/037* (2013.01); *G01S 19/13* (2013.01); *H04R 29/002* (2013.01); *H04R 5/04* (2013.01); *H04R 2499/13* (2013.01)

(58) Field of Classification Search
CPC .......... H04R 3/12; H04R 29/002; H04R 5/02; H04R 5/04; H04R 2499/13; H04R 25/55; H04R 25/552; H04R 25/554; H04R 25/556; H04R 25/558; B60Q 5/006; B60R 16/037; G01S 19/13; H04B 1/082; H04S 5/00; G10H 1/361; H04M 1/7253
USPC .......... 381/86, 302, 315; 700/94; 455/414.3, 455/3.06; 340/438, 77, 78, 79; 322/24, 322/28
See application file for complete search history.

(56) References Cited

U.S. PATENT DOCUMENTS

| | | | | |
|---|---|---|---|---|
| 2006/0074645 A1* | 4/2006 | Tischer | ............... | G10K 15/02 704/226 |
| 2008/0077261 A1* | 3/2008 | Baudino | ............... | H04H 20/63 700/94 |
| 2009/0147134 A1* | 6/2009 | Iwamatsu | ............... | H04N 5/60 348/484 |

FOREIGN PATENT DOCUMENTS

| | | |
|---|---|---|
| JP | 2006-085693 A | 10/2006 |
| JP | 2008-035472 A | 2/2008 |
| KR | 10-2014-0000802 | 1/2014 |
| KR | 10-1371875 B1 | 3/2014 |
| KR | 10-2014-0056433 A | 5/2014 |
| KR | 10-1500150 B1 | 3/2015 |
| KR | 10-2015-0093457 A | 8/2015 |
| KR | 10-2016-0025318 A | 3/2016 |
| KR | 10-2016-0028903 A | 3/2016 |

\* cited by examiner

*Primary Examiner* — Leshui Zhang
(74) *Attorney, Agent, or Firm* — Brinks Gilson & Lione

(57) ABSTRACT

A method of controlling a sound system installed in a plurality of vehicles is disclosed that includes recognizing a plurality of sound systems respectively installed in a plurality of vehicles, determining relative positions of the plurality of vehicles, and controlling operations of the plurality of sound systems according to the relative positions and specifications of each of the plurality of vehicles.

19 Claims, 14 Drawing Sheets

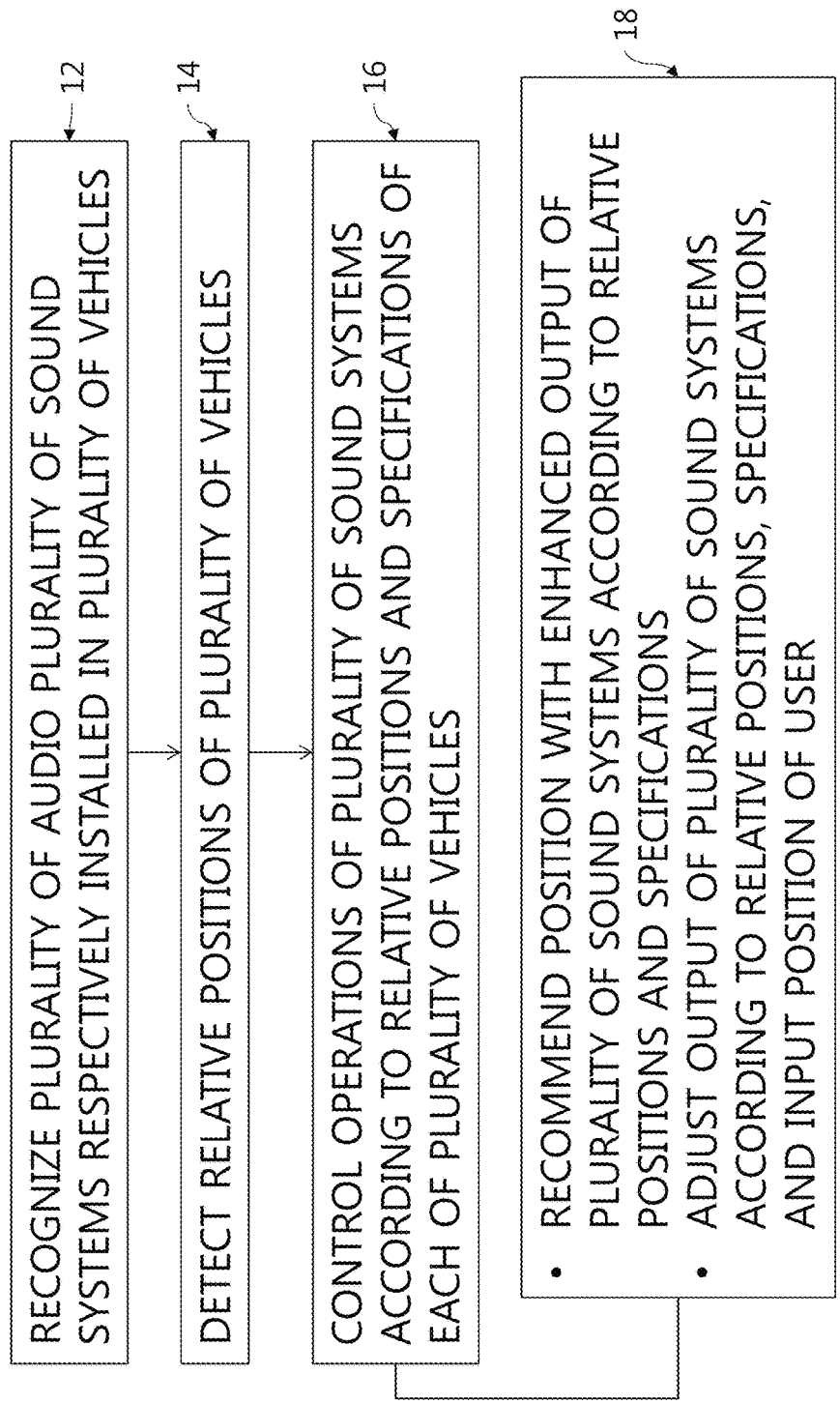

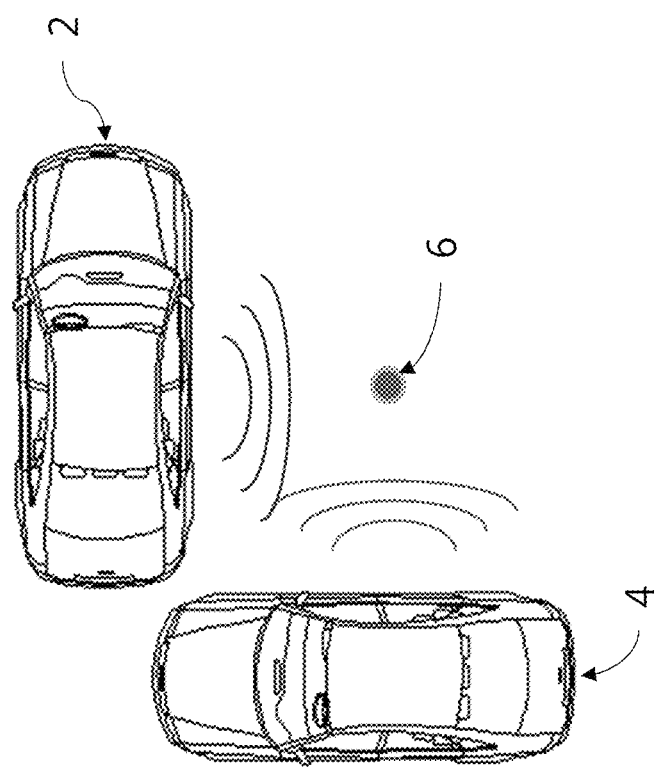

METHOD AND APPARATUS FOR CONTROLLING SOUND SYSTEM INCLUDED IN AT LEAST ONE VEHICLE

This application claims priority to Korean Patent Application No. 10-2016-0109379, filed on Aug. 26, 2016 in the Korean Intellectual Property Office, the disclosure of which is hereby incorporated by reference in its entirety as if fully set forth herein.

BACKGROUND

Technical Field

The present disclosure relates to a technology for managing at least one vehicle for a specific purpose, and more particularly, to an apparatus and method for operatively associating sound systems included in at least one vehicle to enhance user convenience.

Discussion of the Related Art

As experience levels and expectations of drivers or users who use vehicles become higher, vehicles have been developed to include various devices or systems to satisfy such drivers or users. For example, a vehicle may include a multipurpose unit that allows drives or users to have diverse experiences through devices, systems, or the like included in the vehicle. A vehicle may further include a transportation unit for transporting the vehicle from one location to another.

Recently, as more people find themselves enjoying outdoor activities, interest for a device capable of producing an abundant sound effect outdoors has increased. For example, a Bluetooth speaker may be easily connected to an audio and video reproducing device to output audio received from the audio and video reproducing device outdoors.

SUMMARY

Accordingly, a method and apparatus are disclosed for controlling sound systems included in at least one vehicle that substantially obviates one or more problems due to limitations and disadvantages of the related art.

A feature described in the present disclosure includes a method and an apparatus for controlling a sound volume or direction of a speaker installed in at least one vehicle according to a user outside a vehicle in order to control a device such as a speaker installed in a vehicle according to user needs even when a vehicle is not driven.

Another feature described in the present disclosure includes a method and an apparatus for separately controlling speakers installed in a plurality of vehicles based on user position and vehicle position through a wireless interface of the vehicles in order to provide sound appropriate for users outside a vehicle.

Another feature described in the present disclosure includes a method and an apparatus for providing a wireless interface for sharing devices installed in different vehicles and controlling the devices for a preset operation.

Additional advantages, objects, and features will be set forth in part in the description which follows and in part will become apparent to those having ordinary skill in the art upon examination of the following or may be learned from practice of the features. The objectives and other advantages of the features may be realized and attained by the structure particularly pointed out in the written description and claims hereof as well as the appended drawings.

To achieve these objects and other advantages and in accordance with the scope of the disclosure, as embodied and broadly described herein, a method of controlling sound systems installed in a plurality of vehicles includes recognizing a plurality of sound systems respectively installed in a plurality of vehicles, determining relative positions of the plurality of vehicles, and controlling operations of the plurality of sound systems according to the relative positions and specifications of each of the plurality of vehicles.

The controlling may include determining output recommendation positions of the plurality of sound systems according to the relative positions and the specifications.

Distances of each of the plurality of vehicles from the output recommendation position may be the same.

A difference in the distances between each of the plurality of vehicles and the output recommendation position may be within a preset range, and the range may be determined according to a difference in performances of the plurality of sound systems.

The controlling may include adjusting an output of the plurality of sound systems according to the elative positions, the specifications, and an input position of a user.

The output recommendation position may be determined as a range with a preset radius, and the input position may be determined through a global positioning system (GPS).

Output of the plurality of sound systems may include at least one operation of volume control and direction adjustment of a speaker installed in the plurality of vehicles or adjustment of an equalizer, an amplifier, and/or an echo chamber.

The plurality of sound systems are recognized based on at least one of long-range and short-range communication technologies and the plurality of vehicles may permit share of the sound system through a preset security procedure.

The relative positions may include at least one of a distance and an angle between the plurality of vehicles and the specifications may include at least one of arrangement and performance of the sound system according to data of the vehicle.

The method may further include determining one of the plurality of sound systems as a master device and other as a slave device.

The slave device may stop reproduction of a sound source thereof and output a sound source transmitted from the master device through a speaker.

The method may further include control of operations of the plurality of sound systems when at least one of the plurality of vehicles moves.

The sum of the outputs of each of the plurality of sound systems may be increased via the operations of the plurality of sound systems.

The operations of the plurality of sound systems may include outputting audio through different audio channels and adjusting reproduction times of the audio outputs to achieve stereo sound.

The method may further include recognizing a position of a terminal operatively associated with the plurality of sound systems as a set point.

The method may further include requesting movement of at least one of the plurality of vehicles upon determining that it is difficult to control the plurality of sound systems according to the relative positions and specifications of each of the plurality of vehicles.

In another feature described in the present disclosure, an apparatus is disclosed for providing sound tracking information in a vehicle including a processing system that comprises at least one data processor and at least one computer-readable memory storing a computer program. Herein, the processing system may be configured to cause the apparatus to: recognize a plurality of sound systems respectively installed in a plurality of vehicles, determining relative positions of the plurality of vehicles, and control operations of the plurality of sound systems based at least on the relative positions and specifications of each of the plurality of vehicles.

Further, a non-transitory computer readable medium may store a program causing a processing system to execute a process for providing sound tracking information. The process may include recognizing a plurality of sound systems respectively installed in a plurality of vehicles, determining relative positions of the plurality of vehicles, and controlling operations of the plurality of sound systems according to the relative positions and specifications of each of the plurality of vehicles.

In another feature described in the present disclosure, an apparatus for controlling sound systems respectively installed in a plurality of vehicles may include a device detector for a plurality of sound systems respectively installed in a plurality of vehicles, a position determiner for determining relative positions of the plurality of vehicles, and a device controller for controlling operations of the plurality of sound systems according to the relative positions and specifications of each of the plurality of vehicles.

The device controller may include at least one of a recommended position determiner for determining output recommendation positions of the plurality of sound systems according to the relative positions and the specifications, and an output controller for adjusting output of the plurality of sound systems according to the elative positions, the specifications, and an input position of a user.

Distances of each of the plurality of vehicles from the output recommendation position may be the same.

A difference in the distances between each of the plurality of vehicles and the output recommendation position may be within a preset range, and the range may be determined according to a difference in performances of the plurality of sound systems.

The output recommendation position may be determined as a range with a preset radius, and the input position may be determined through a global positioning system (GPS).

The output controller may generate a control signal for performing at least one operation of volume control and direction adjustment of a speaker installed in the plurality of vehicles or adjustment of an equalizer, an amplifier, and an echo chamber.

The plurality of sound systems may be recognized based on at least one of long-range and short-range communication technologies and may each further include a wireless communicator for performing a preset security procedure with the plurality of vehicles to acquire operational control of the sound system.

The relative positions may include at least one of a distance and a respective angle between the plurality of vehicles, and the position determiner may determine the distance based on information transmitted from a global positioning system (GPS) installed in the plurality of vehicles or according to a user input.

The apparatus may further include a data storage for storing at least one of arrangement and performance of the sound system according to data of the vehicle as the specifications, wherein, when a vehicle, information of which is not stored in the data storage, is detected, the device controller may request an external server of information The device controller may determine one of the plurality of sound systems as a master device and others as a slave device.

The device controller may stop reproduction of a sound source thereof and output a sound source transmitted from the master device through a speaker.

The device controller may stop control of operations of the plurality of sound systems when at least one of the plurality of vehicles moves.

The plurality of vehicles may be different types of vehicles or available from different manufacturers.

The sum of output of each of the plurality of sound systems may be increased via the operations of the plurality of sound systems.

The operations of the plurality of sound systems may include outputting of different audio channels and adjusting of reproduction time to obtain stereo sound.

The device controller may recognize a position of a terminal operatively associated with the plurality of sound systems as a set point.

The apparatus may further include a user interface for requesting movement of at least one of the plurality of vehicles upon determining that it is difficult to control the plurality of sound systems according to the relative positions and specifications of each of the plurality of vehicles.

It is to be understood that both the foregoing general description and the following detailed description of the present features are exemplary and explanatory and are intended to provide further explanation of the features as claimed.

BRIEF DESCRIPTION OF THE DRAWINGS

The accompanying drawings, which are included to provide a further understanding of the disclosed forms and are incorporated in and constitute a part of this application, illustrate form(s), and together with the description serve to explain the principles of the disclosed features. In the drawings:

FIG. 1 is a diagram illustrating a method of controlling sound systems installed in a plurality of vehicles;

FIGS. 5A and 5B are diagrams for explanation of a method of controlling sound systems installed in two adjacent vehicles;

DETAILED DESCRIPTION OF THE INVENTION

Figure 2A:
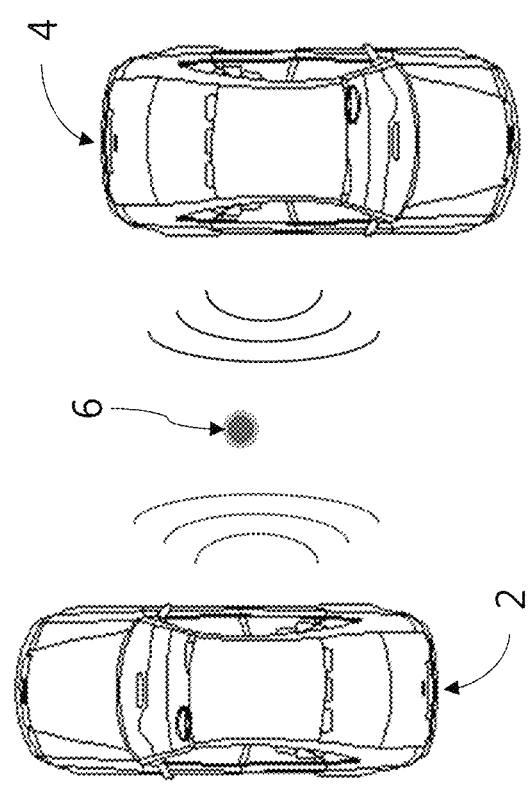
FIGS. 2A and 2B are diagrams for explanation of a method of sound systems installed in two facing vehicles.

Reference will now be made in detail to an apparatus and various methods according to forms, examples of which are illustrated in the accompanying drawings. The suffixes "module" and "unit" of elements herein are used for convenience of description and thus can be used interchangeably and do not have any distinguishable meaning or function. The "modules" and "units" described herein may be representative of a combination of software, hardware, and circuitry components for implementing the related processes attributed to the "modules" and "units" described herein.

In the description of forms, it will be understood that when an element is referred to as being "on (above)" or "under (below)" another element, it may be directly on or under the other element or intervening elements may be present. In addition, the expression "on (above)" or "under (below)" may be interpreted as including a lower direction as well as an upper direction.

Vehicle availability at a place for outdoor activities of users of a vehicle may be increased to enhance productivity of the vehicle. Recently, a Bluetooth speaker, for example, having excellent audio output through which a user may enjoy music outdoors where sound is under most conditions harder to hear due to an open space and naturally generated noise, has attracted consumer interest. A burden may be imposed to users when a separate Bluetooth speaker with good output is used. Accordingly, there may be a need for a method or apparatus for controlling output of a sound system (e.g., speaker) installed in a vehicle to achieve a stereo function by operatively associating nearby vehicles with each other, for optimizing or maximizing a sound effect. In addition, speakers of respective vehicles may be independently controlled (e.g., volume-managed) through a wireless interface and may support the consumer to achieve a surround sound effect outside the vehicle.

FIG. 1 is a diagram illustrating a method of controlling sound systems installed in a plurality of vehicles.

As illustrated in the drawing, the method of controlling sound systems installed in a plurality of vehicles may include recognizing (12) a plurality of sound systems installed in the respective plurality of vehicles, determining relative positions of the plurality of vehicles (14), and controlling (16) operations of the plurality of sound systems according to the relative positions and specifications of the plurality of vehicles.

In more detail, the controlling (16) of the operations of the plurality of sound systems may include at least one of determining (18) an output recommendation position of the plurality of sound systems according to the relative positions and the specifications, and adjusting (18) output of the plurality of sound systems according to the relative positions, the specifications, and an input position of a user.

Here, the output recommendation position provided to the user during control of the sound systems installed in the plurality of vehicles may be determined in a range of a predetermined radius. For example, speakers installed in a plurality of vehicles as sound systems that are operatively associated with each other may be controlled. When a position where speaker output is optimized or maximized may be estimated and information thereon is transmitted to a user, the user may experience sound output from the speaker at the position.

For example, distances of a plurality of vehicles from the output recommendation position may be the same. When a plurality of vehicles has the same performance and specifications, three or four vehicles may be arranged in the form of a triangle or a quadrangle. In this case, the output recommendation position may be a central point of a space formed by a triangle or a quadrangle.

For example, a difference in distances between a plurality of vehicles and the output recommendation position may be within a preset range distance. In this case, the range may be determined according to a difference in performance of the plurality of sound systems. In the aforementioned example, when four vehicles are arranged in the form of a quadrangle, sound systems installed in the respective vehicles may not have the same performance. When performance of the sound systems installed in the plurality of vehicles and vehicle data are considered, a point that is slightly close to a specific vehicle instead of a central point of a space formed by a quadrangle may be the output recommendation position.

In the controlling of the operations of the plurality of sound systems, the sound systems may be controlled so as to optimize or maximize output at a position input by a user. In this case, the position input by the user may be determined by a global positioning system (GPS) included in a portable terminal, or the like, of the user. Upon receiving a user position, sound systems installed in the plurality of vehicles may be separately controlled so as to optimize or maximize a sound effect at the corresponding position.

For example, the output of the plurality of sound systems, which are separately controlled so as to optimize or maximize output by operatively associating the plurality of vehicles with each other may include at least one of volume control and direction control of a speaker, and adjustment of an equalizer, an amplifier, and an echo chamber. Here, a controllable sound system may be varied according to a type of an audio associated device installed in a separate vehicle.

For example, the sum of output of the sound systems may be increased by operations of the plurality of sound systems. When a user does not set the sound systems for specific purpose, it may not be necessary to offset sounds output through the plurality of sound systems by each other.

When a plurality of sound systems installed in a plurality of vehicles output different audio channels, stereo sound providing multi-directional audio perspective may be produced. In the plurality of sound systems installed in the plurality of vehicles, one sound system may be controlled to output a left channel, another system may be controlled to output a right channel, and another system may be controlled to output a sub woofer channel. Distances from positions of a plurality of vehicles may be different and, thus, a reproduction time of the sound system may be adjusted.

In order to control sound systems installed in the plurality of vehicles, wireless communication with the sound systems installed in the plurality of vehicles based on one of long-range or short-range communication technologies needs to be possible. This function may be implemented through an application of a portable phone that is operatively associated with a vehicle or may also be implemented through a separate terminal with a wireless communicator. For example, the terminal may include communication devices such as a notebook personal computer (PC) and a tablet PC as well as a portable phone.

In order to control sound systems installed in a plurality of vehicles, a terminal in charge of a control function needs to be operatively associated with the plurality of vehicles preferentially. To this end, the terminal may perform a preset security procedure with each of the plurality of vehicles to be permitted to share a sound system installed in the corresponding vehicle. Here, vehicles that are operatively associated with each other may not be limited to the same type of vehicles and vehicles available from the same manufacturer. Even different types of vehicles or vehicles available from different manufacturers may share a plurality of electronic apparatuses installed in vehicles as long as vehicle security is not compromised and, to this end, a proposed security procedure may be performed according to a vehicle type. The security procedure may be standardized according to each manufacturer or vehicle type or determined according to international standards without limitation. In addition, the aforementioned security procedure may be determined through an application that is operatively associated with a vehicle or a manufacturer of a terminal.

Security of vehicles may not be as much of a concern when sharing access to sound systems installed in a plurality of non-moving vehicles. When sound systems installed in vehicles are shared to be limited to a plurality of non-moving vehicles, a method of controlling sound systems installed in a plurality of vehicles may be performed without a separate security procedure.

In order to optimize or maximize a sound effect by operatively associating sound systems installed in a plurality of vehicles, relative positions between the sound systems need to be known. For example, one vehicle includes a plurality of speakers. A position of each speaker is known based on vehicle specifications (data) and, thus, when relative positions of vehicles are known, relative positions of a plurality of sound systems may be recognized. Accordingly, relative positions required to control sound systems installed in a plurality of vehicles may include at least one of a distance and angle between the vehicles.

Specifications of each of the plurality of vehicles may include arrangement and performance of sound systems according to vehicle data. For example, there may be a difference in sounds to be output according to performance of a speaker installed in a vehicle, and a direction of a speaker may be controlled. When a plurality of sound systems is controlled according to specifications of a sound system installed in each vehicle, a more effective result may be obtained.

The method of controlling sound systems installed in a plurality of vehicles may further include determining one of a plurality of sound systems as a master device and other systems as a slave device. The sound systems installed in the vehicle may include separate audio reproduction apparatuses as well as speakers. In the procedure of operatively associating a plurality of sound systems, when the audio reproducing apparatuses reproduce different sound sources or outputs different sounds, it may not be effective to operatively associate the plurality of sound systems with each other. Accordingly, an apparatus for reproducing a sound source to be output by the plurality of sound systems or generating a sound may be a sound system installed in one vehicle recognized as a master device, and other operatively associated sound systems may be determined as a slave device. The slave device may prevent generation of a sound source or sound thereof and output a sound source or sound transmitted from the master device through a speaker connected to the slave device.

The method of controlling sound systems installed in a plurality of vehicles may further include stopping control of an operation of the plurality of sound systems when at least one of a plurality of vehicles moves. The method of controlling sound systems installed in a plurality of vehicles may be provided only when all operatively associated vehicles do not move for safety of drivers or users.

The method of controlling sound systems installed in a plurality of vehicles may further include recognizing a position of a terminal that is operatively associated with the plurality of sound systems as a set point. When a plurality of sound systems is controlled through a terminal that is operatively associated with a plurality of vehicles, a position of a terminal may be determined as an initial set point before a user inputs a position.

In addition, the method of controlling sound systems installed in a plurality of vehicles may further include requesting movement of at least one of a plurality of vehicles upon determining that it is difficult to control a plurality of sound systems according to relative positions and specifications of each of the plurality of vehicles. For example, the plurality of sound systems may be controlled through a terminal that is operatively associated with a plurality of vehicles. In this case, when it is difficult to select an appropriate output recommendation position, a message requesting or suggesting at least one vehicle to move may be transmitted to a user through a user interface of a terminal.

An example of the case in which the method of controlling sound systems installed in a plurality of vehicles is used will be described below.

First, it is assumed that a driver travels together with his or her younger brother or sister and his or her family in a plurality of vehicles. The driver and users may park the plurality of vehicles and talk to each other while listening to music around the vehicles or enjoy a meal. In this case, one (master car) of the parked vehicles and the other vehicles may be connected via wireless communication technologies. Then an interface for a speaker association function between vehicles may be executed. When types of the plurality of vehicles are selected and positions thereof are input, a recommended position for optimizing or maximizing sound may be provided according to the selected types and positions of the vehicles. A user may select a position proposed through a plurality of vehicles or move a sound focus to a desired position. When the user inputs a new position, each of the sound systems installed in the vehicle may be re-adjusted according to the respective positions. When various functions (e.g., a surrounding function of a sound source) provided by the sound system are used, a stereo effect outside vehicles may be obtained. Here, even if the number of vehicles is increased by n (n being a natural number), a better stereo effect may be obtained using speakers installed in the respective vehicles.

As described above, the method of controlling sound systems installed in a plurality of vehicles may be embodied in an apparatus installed in a vehicle or through a separate terminal that is operatively associated with a vehicle. When apparatuses for controlling sound systems installed in a plurality of vehicles are installed in the vehicles, the apparatuses installed in the respective vehicles may be connected to each other through short-range communication technologies for supporting one to multi (1:n) communication such as Wi-Fi and Bluetooth.

Figure 2B:
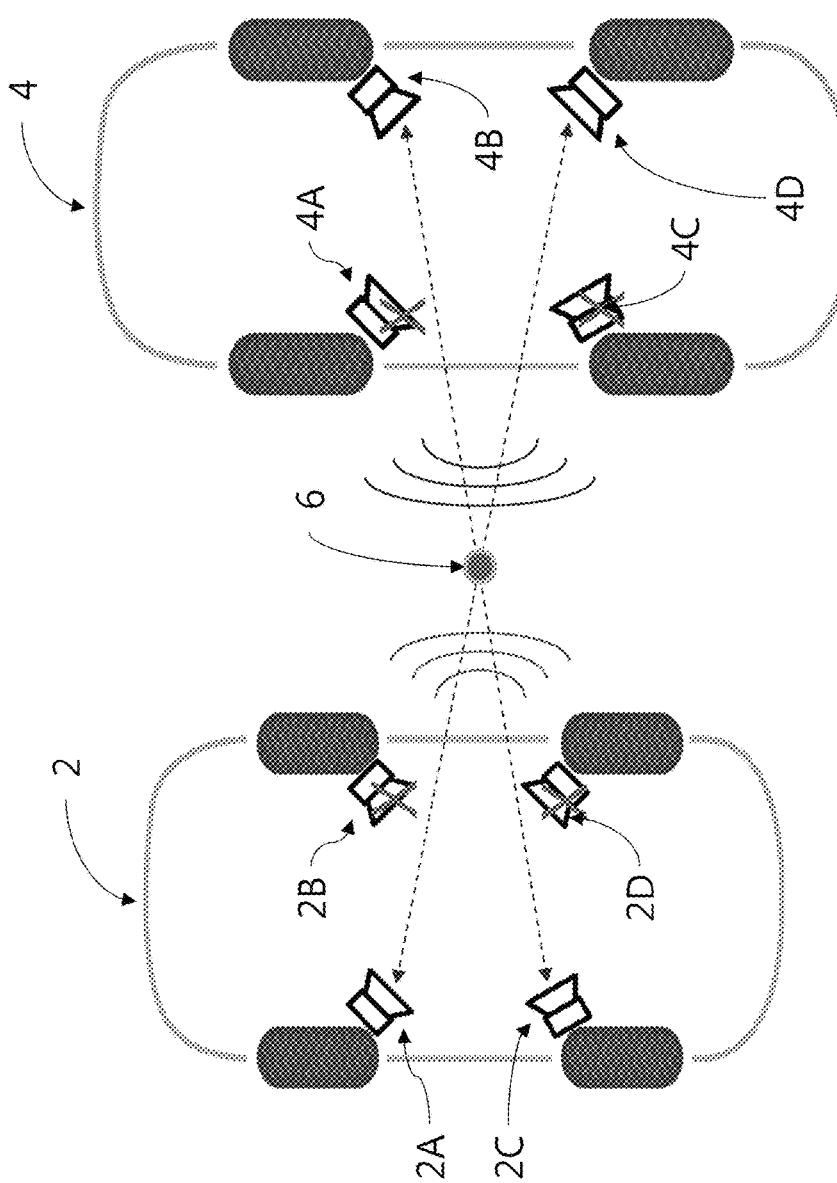

FIGS. 2A and 2B are diagrams for explanation of a method of controlling sound systems installed in two facing vehicles.

With reference to FIG. 2A, a stereo sound system using speakers installed in a plurality of vehicles will be described. According to simple vehicle arrangement in which two vehicles 2 and 4 face each other, sound output from the two vehicles 2 and 4 may be used to be optimized or maximized at a position 6 outside the vehicles 2 and 4.

Referring to FIG. 2B, the two vehicles 2 and 4 may respectively control speakers included in the vehicles 2 and 4 in order to optimize or maximize sound at the position 6 outside the vehicles 2 and 4. In order to optimize or maximize a sound effect through the speakers included in the two vehicles 2 and 4, operations of some 2B and 2D of four different speakers 2A, 2B, 2C, and 2D included in one vehicle 2 may be stopped so as to output sound only from some other speakers 2A and 2B. In this case, the activated speakers 2A and 2B may output sound in a direction toward a position at which another vehicle 4 is positioned among speakers installed in the vehicle 2 but other speakers 2B and 2D in the vehicle 2 may be deactivated because the speakers 2B and 2D cannot output sound in a direction toward a position in which the vehicle 4 is positioned. Similarly, the another vehicle 4 that is operatively associated with the one vehicle 2 may also include a plurality of speakers 4A, 4B, 4C, and 4D. Whether the plurality of speakers 4A, 4B, 4C, and 4D is activated may also be similar to whether the plurality of speakers 2A, 2B, 2C, and 2D included in the facing vehicle 2 is activated. Thereby, a plurality of speakers included in the two facing vehicles 2 and 4 may be operated to maximize or optimize a sound effect at the specific position 6 between the two vehicles 2 and 4.

In order to effectively control sound systems installed in a plurality of vehicles, more accurate position information may be acquired through a sensor installed in a vehicle or a global positioning system (GPS) or position information may be received from a user.

Figure 3:
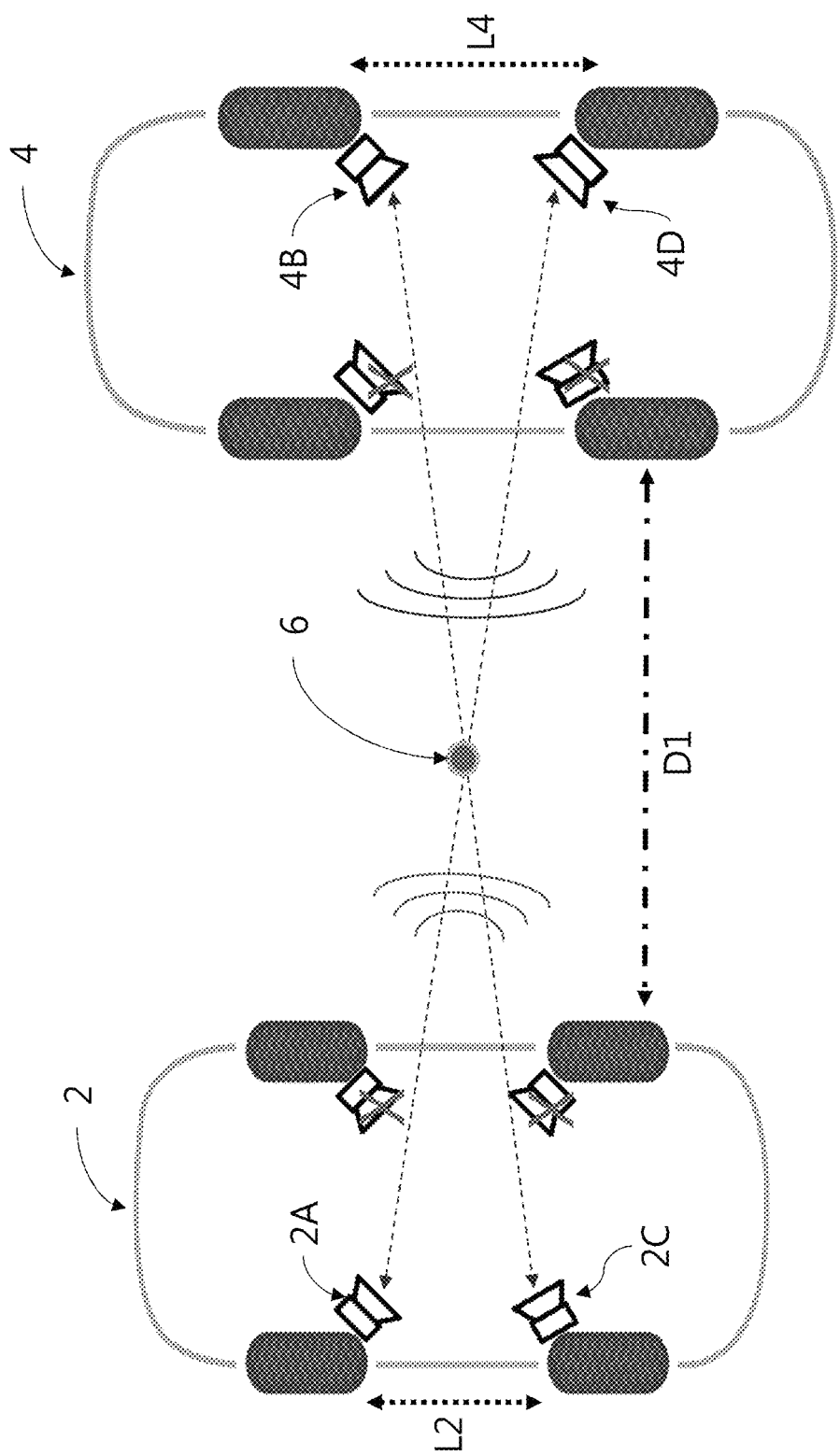
FIG. 3 is a diagram for explanation of a method of determining a recommended position when sound systems installed in two facing vehicles are operatively associated with each other.

FIG. 3 is a diagram for explanation of a method of determining a recommended position when sound systems installed in two facing vehicles are operatively associated with each other. For example, in order to determine the recommended position, a vehicle arrangement situation and various vehicle types may be considered.

First, vehicle models of the two vehicles 2 and 4 may be input through the user interface. A user or a driver may directly input a vehicle model to be controlled through the user interface or may detect a vehicle at an adjacent position using a sensor, a communication device, and so on installed in a vehicle and provide a list of vehicles to be controlled to the user. For example, since a plurality of vehicles is positioned at an adjacent space and a user may intend to operatively associate only some vehicles with each other, vehicle models of the two vehicles 2 and 4 may be selected or determined according to a final input of a user or a driver. In addition, when a vehicle is operatively associated with another vehicle to store operation information (history), information on the corresponding vehicle may be automatically input without user input.

When model information on the two associated vehicles 2 and 4 is input, information items L2 and L4 on detailed specifications (e.g., electrical components of each vehicle, a speaker position, and output information of a speaker) of sound systems installed in the two vehicles 2 and 4 may be collected according to information stored in a database DB.

A distance D1 between the two vehicles 2 and 4 may be determined according to input of a driver or a user. When the two vehicles 2 and 4 have accurate position information through a global positioning system (GPS), it may not be necessary for a drive to separately input the distance D1 between vehicles. When relative position information (distance) between the two vehicles 2 and 4 can be detected through information on sensors installed in the two vehicles 2 and 4, it may not be necessary for a driver to separately input the distance D1 between vehicles either.

For example, the recommended position 6 for optimizing or maximizing output of sound may be determined using a plurality of speakers included in the two vehicles 2 and 4 based on information input from a user or information collected through a sensor or device installed in a vehicle. Then, the determined recommended position 6 may be signaled to the user or the driver and operations of speakers (e.g., volume or direction) may be controlled to optimize or maximize a plurality of speakers at the recommended position 6. With reference to FIG. 3, in the two vehicles 2 and 4, the speakers 2A, 2C, 4B, and 4D that can output sound in a direction toward the recommended position 6 may be activated but a speaker that can output sound in a direction opposite to the recommended position 6 may be deactivated.

With regard to the aforementioned method, a control method of a separate apparatus may be changed according to sound systems installed in the two vehicles 2 and 4, which may be applied in a procedure of determining a position for optimizing or maximizing a sound effect after input specifications of a vehicle, which are input to a database, are collected.

FIG. 3 is a diagram for explanation of a case in which sound systems installed in two facing vehicles are operatively associated with each other. However, sound systems installed in two or more vehicles may be operatively associated through short-range wireless communication technologies for supporting one to multi (1:n) communication such as Wi-Fi and Bluetooth.

Figure 4:
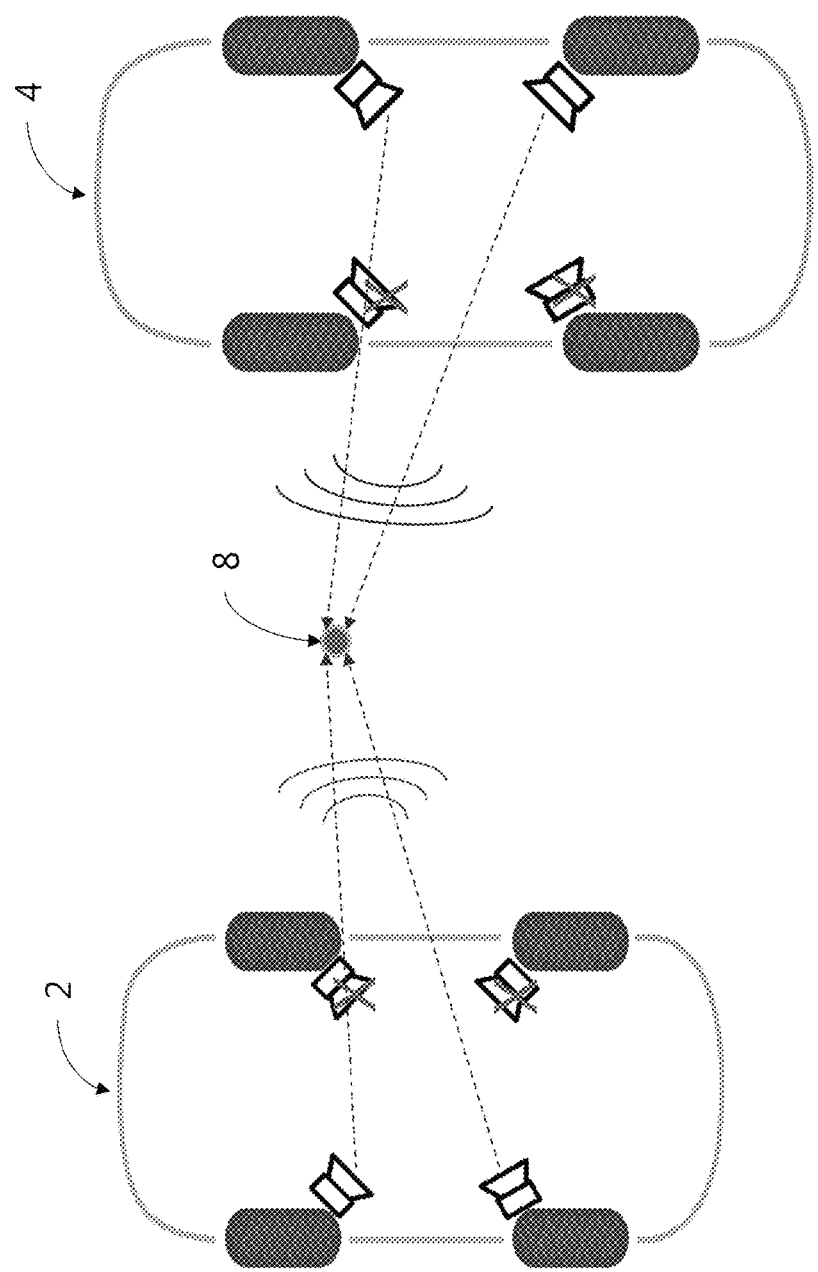
FIG. 4 is a method of controlling sound systems installed in two facing vehicles according to a user position.

FIG. 4 is a method of controlling sound systems installed in two facing vehicles according to user position.

In addition to the function of providing a position for optimizing sound described with reference to FIG. 3, as a user moves a focus using a touch through a user interface for supporting focus adjustment, speaker output and time difference may be adjusted according to a distance from an optimum position based on a direction of the focus as illustrated in FIG. 4.

When models, specifications, relative position information, and so on of the two facing vehicles 2 and 4 are collected, if a user inputs a desired specific position 8, sound systems included in the two vehicles 2 and 4 may be controlled according to the specific position 8 input by the user.

For example, in order to control sound systems installed in two facing vehicles according to the specific position 8 input by the user, a difference between the recommended position 6 (refer to FIG. 3) and the specific position 8 which are determined according to the models, specifications, relative position information, and so on of the two vehicles 2 and 4 may be used. When each sound system is controlled to optimize or maximize a sound effect at a recommended position, output (volume and direction) of each sound system may be readjusted using a direction and a distance by which a vehicle is moved to the specific position 8 from the recommended position.

In order to control sound systems installed in two facing vehicles, a control parameter of each sound system may be determined with respect to the specific position 8 input by the user without using a recommended position and a control parameter (control value) of each sound system according to the recommended position.

In order to maximize or optimize an effect of sound output from sound systems installed in two facing vehicles, when an interval between sound systems is great, the sound systems may output sound with a time difference. For example, when sound is first output from a sound system that is far away compared with a close sound system, sense of difference that a user feels when a plurality of sound systems is operatively associated with each other may be reduced. In this case, adjustment of reproducing time may be determined in consideration of a relative distance and sound speed of a vehicle.

Figure 5B:
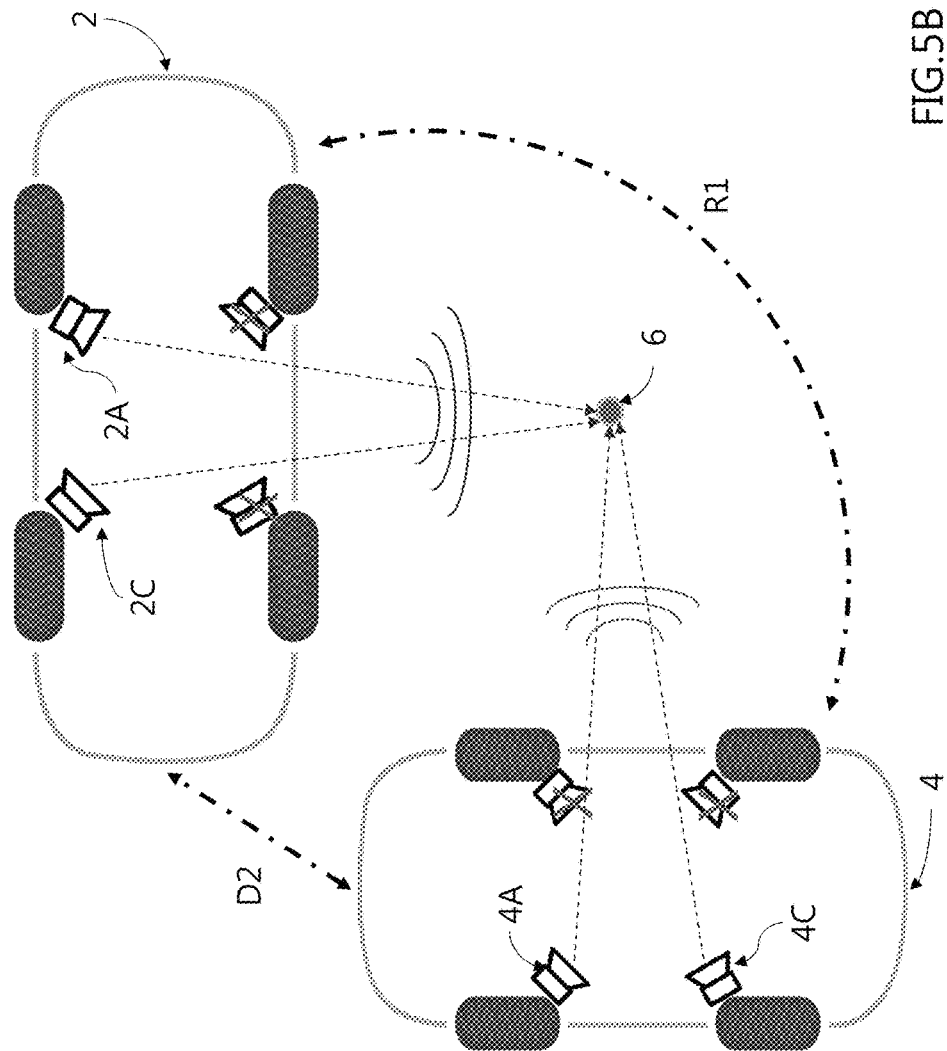

FIGS. 5A and 5B are diagrams for explanation of a method of controlling sound systems installed in two adjacent vehicles. FIGS. 5A and 5B are diagrams for explanation of a case in which vehicles are parked to be perpendicular instead of be parallel.

Referring to FIG. 5, the two vehicles 2 and 4 may be parked to be perpendicular to each other instead of facing each other.

Referring to FIG. 5B, in order to control sound systems installed in the two adjacent vehicles 2 and 4, models of the two vehicles 2 and 4 may be determined first. Then, specifications (electrical components of each vehicle and detailed information of a sound system) of the determined models may be collected so as to recognize position information, output information, and control information of sound systems (e.g., 2A, 2C, 4A, and 4C) included in the two vehicles 2 and 4.

Then, the user may input an angle R1 between the two vehicles 2 and 4 as well as a distance D2 between the two vehicles 2 and 4. When relative distances of the two vehicles 2 and 4 and arrangement of the two vehicles 2 and 4 can be measured using sensors and devices installed in vehicles, it may not be necessary for the user to directly input the information.

In order to control sound systems installed in the two adjacent vehicles 2 and 4, the recommended position 6 for maximizing or optimizing a sound effect may be determined based on the collected information.

Position information (e.g., a distance between vehicles and an angle between vehicles) of a plurality of vehicles may be embodied according to user input but when a sound effect is maximized or optimized using a plurality of sound systems, there may be a frequently used arrangement pattern. Position information of a vehicle, input by the user, may be simplified using a preset pattern such as a vertical pattern, a '⊏'-shaped pattern, a circular arc pattern, and a circular pattern.

Figure 6:
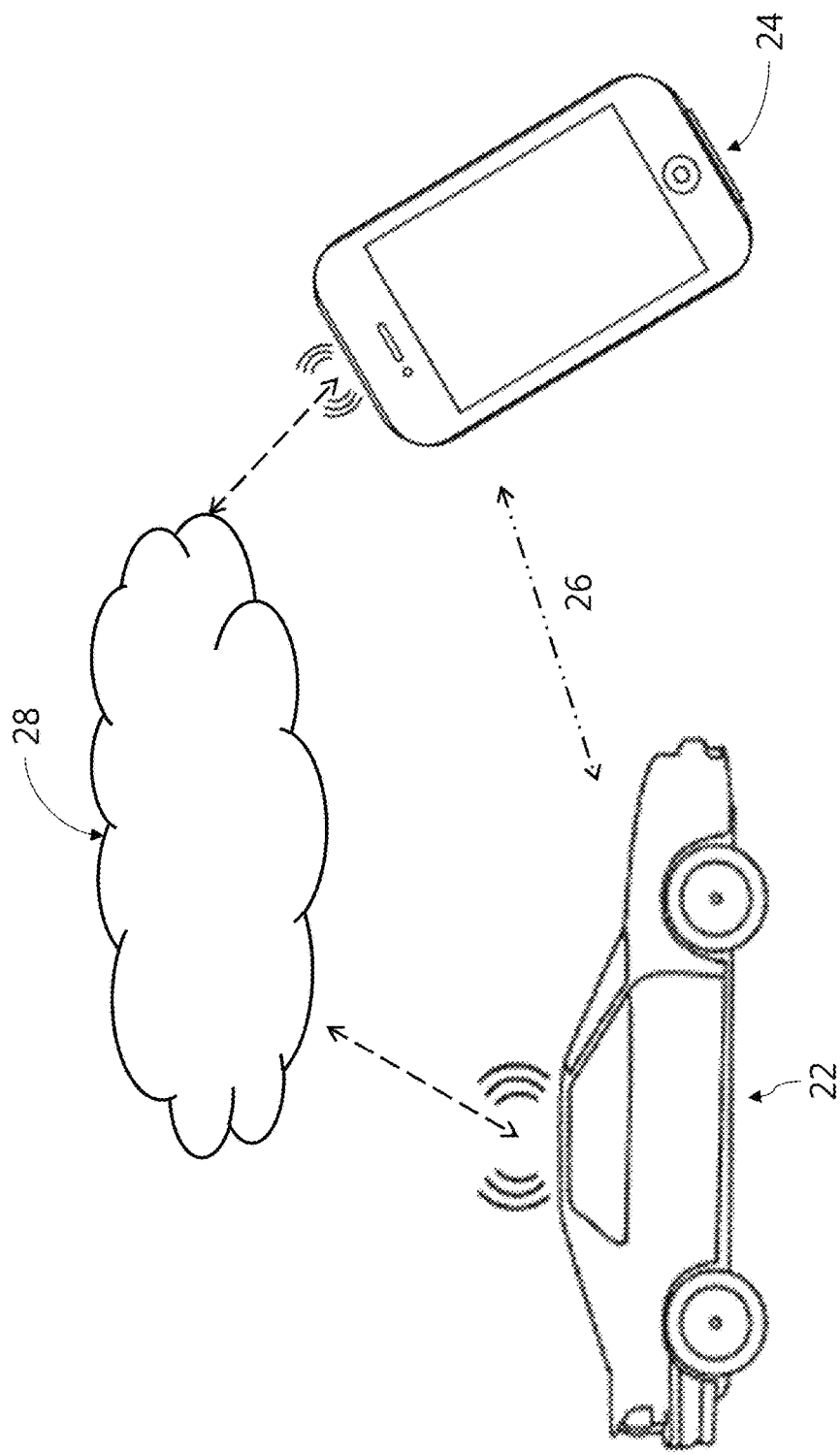
FIG. 6 is a diagram for explanation of a method of operative association between sound systems installed in a plurality of vehicles.

FIG. 6 is a diagram for explanation of a method of operative association between sound systems installed in a plurality of vehicles.

A method and apparatus for controlling sound systems installed in a plurality of adjacent vehicles may be applied to an apparatus installed in vehicle or may be applied to a portable terminal 24 used by a user or a driver. In particular, when a plurality of vehicles is operatively associated through the portable terminal 24, each vehicle 22 and the portable terminal 24 may be connected to each other through short-range wireless communication technologies 26 for supporting one to multi (1:n) communication such as Wi-Fi and Bluetooth. The portable terminal 24 and the vehicle 22 may also be connected through long-range communication technologies 28 such as a radio communication network and the Internet.

Figure 7A:
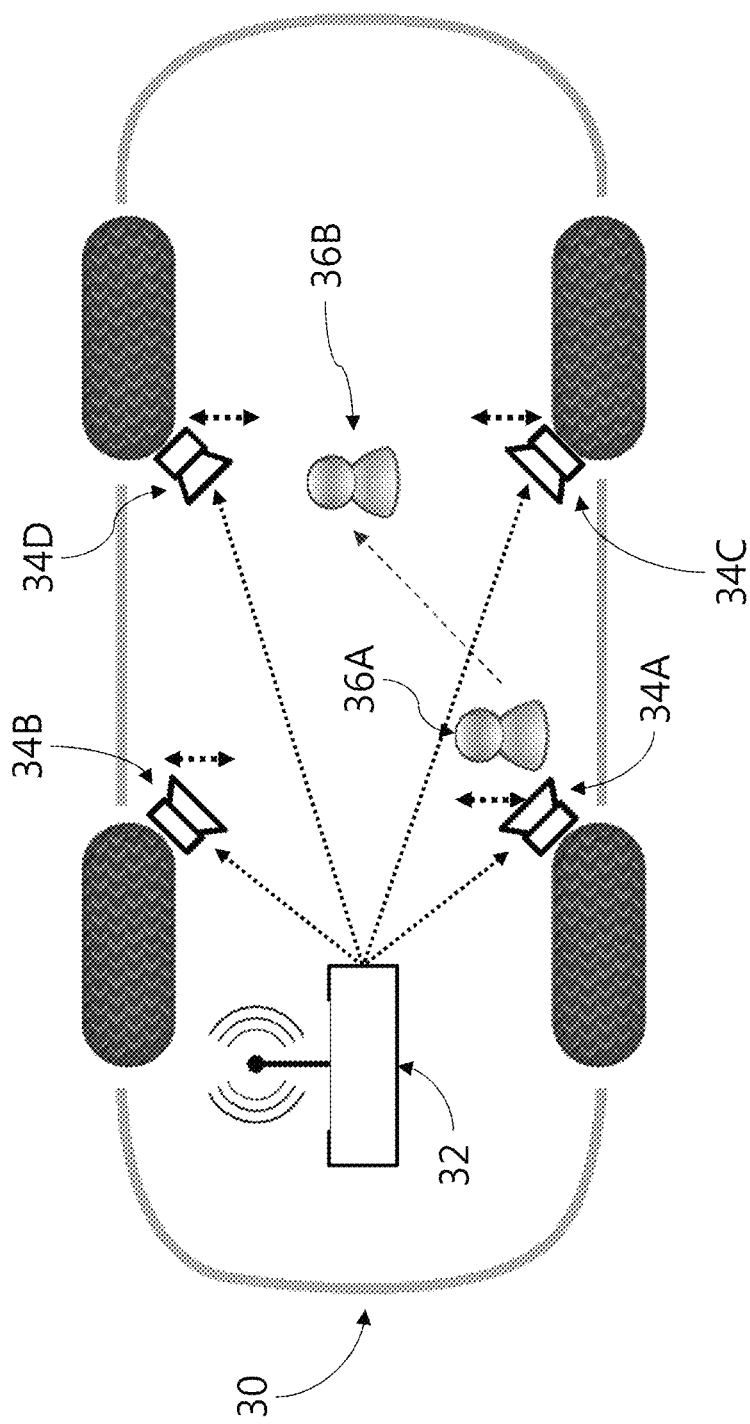
FIGS. 7A and 7B are diagrams for explanation of a method of controlling a sound system installed in a vehicle according to movement of a user.
Figure 7B:
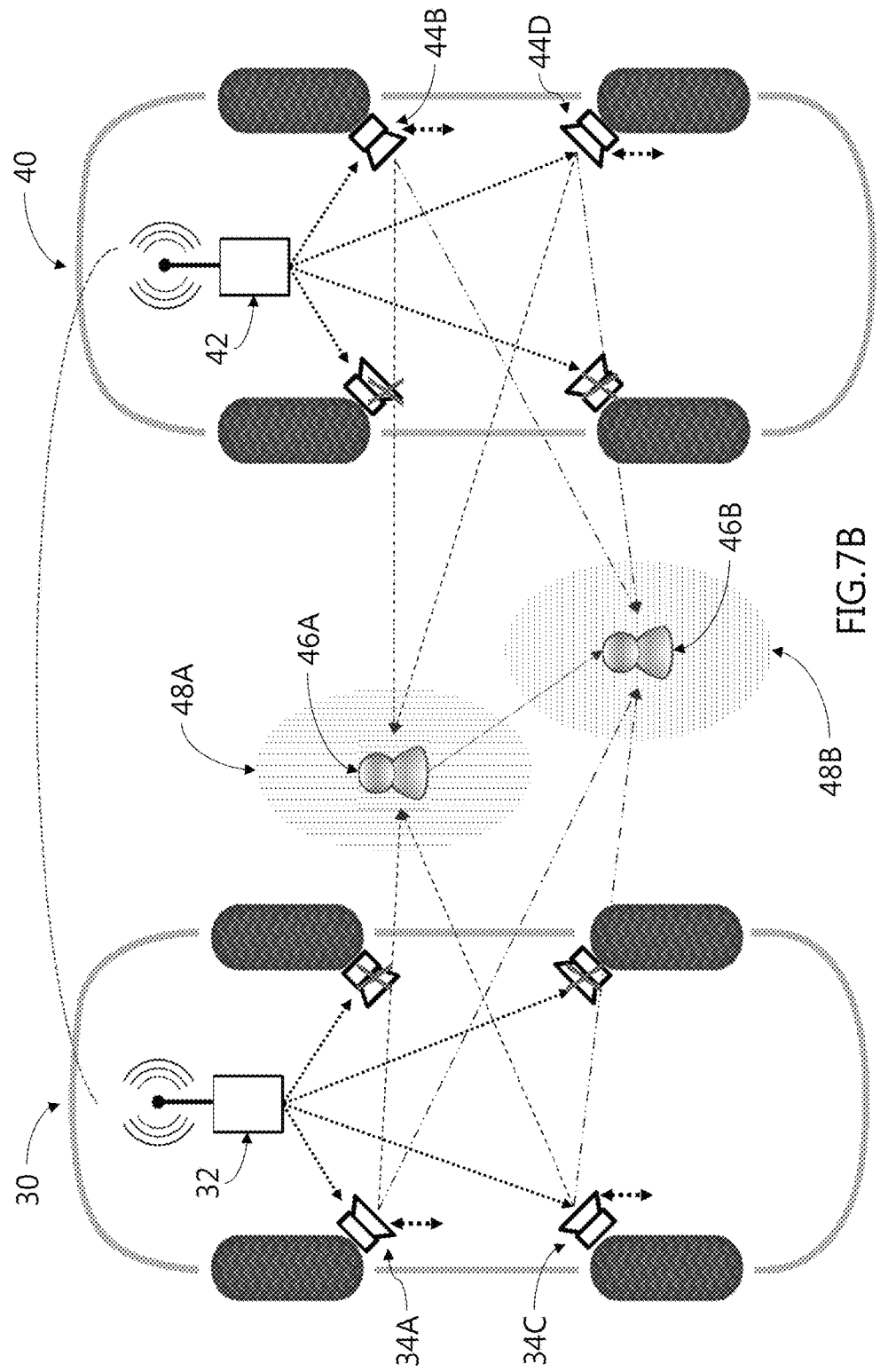

FIGS. 7A and 7B are diagrams for explanation of a method of controlling a sound system installed in a vehicle according to movement of a user.

Referring to FIG. 7A, a vehicle 30 may include a control device 32 for control of a sound system installed in the vehicle 30. The control device 32 may control a sound system including a plurality of speakers 34A, 34B, 34C, and 34D installed in the vehicle and may be connected to a control device installed in another vehicle or a portable terminal of a user through wireless communication technologies.

The control device 32 may separately output volumes/outputs of a plurality of speakers 34A, 34B, 34C, and 34D according to definition of information of a sound source and may perform a stereo function for applying stereo sound output from the plurality of speakers 34A, 34B, 34C, and 34D. In a procedure of reproducing a sound source, a reproducing apparatus included in a sound system installed in a vehicle may recognize additional information (e.g., speaker volumes are separately controlled) stored in the sound source and volumes of the speakers 34A, 34B, 34C, and 34D in the vehicle 30 may be separately adjusted so as to allow a user 36A to hear stereo sound. In addition to a function of compensating for output and time difference of a sound wave, a function of compensating for a stereo function such as Dolby 5.1 may be further achieved.

When positions of users 36A and 36B are changed in the vehicle 30, volumes of the speakers 34A, 34B, 34C, and 34D may be readjusted in the vehicle 30 according to position change.

Referring to FIG. 7B, a stereo function may also be embodied through speakers installed in a plurality of vehicles 30 and 40. The plurality of vehicles 30 and 40 may include control devices 32 and 42, respectively. The control devices 32 and 42 may be operatively associated with each other through wireless communication technologies.

In order to operatively associate sound systems including speakers installed in the plurality of vehicles 30 and 40 with each other, a sound system installed in one of the plurality of vehicles 30 and 40 may be determined as a master device and a sound system installed in another vehicle may be determined as a slave device. Information on a master device and a slave device may be shared via communication between the control devices 32 and 42. A sound system determined as a master device may reproduce a sound source and a sound system determined as a slave device may output a sound source transmitted through the control device 32 or 42 instead of reproducing a sound source.

In order to operatively associate sound systems installed in the plurality of vehicles 30 and 40 with each other, position information between the plurality of vehicles 30 and 40 and specifications of each of the vehicles 30 and 40 may be collected. According to a position input by a user 46A, the control devices 32 and 42 may separately control controllable speakers 34A and 34C or 44B and 44D. In addition, a speaker that cannot output sound in a direction toward the position input by the user 46A may be deactivated.

In this case, a position for optimizing or maximizing output by a plurality of sound systems may be indicated as a region 48A with a preset radius through an interface so as to correspond to the position input by the user 46A.

When the user 46A moves and is detected at a new position 46B or a user inputs the new position 46B, the control devices 32 and 42 may reset a controllable speaker so as to correspond to the new position 46B. A position for optimizing or maximizing output by a plurality of sound systems may be indicated as the region 48A with a preset radius through an interface so as to correspond to the new position 46B.

For example, a stereo function in the vehicles 30 and 40 is assumed in such a way that all reference volumes of the speakers 34A, 34C, 44B, and 44D are set to the same value '10'. Then, relative values of volume +10 and −5 may be added to volumes of a left side 20 and a right side 5, respectively to achieve a stereo effect. A stereo function using speakers installed in a plurality of vehicles may determine an output value of each speaker as a reference value according to a recommended position or a user position. For example, when a left speaker is set to '18' and a right speaker is set to '14', +10 and −5 may be added to the values to be adjusted to '28' and '9', respectively so as to embody a stereo function.

Figure 8A:
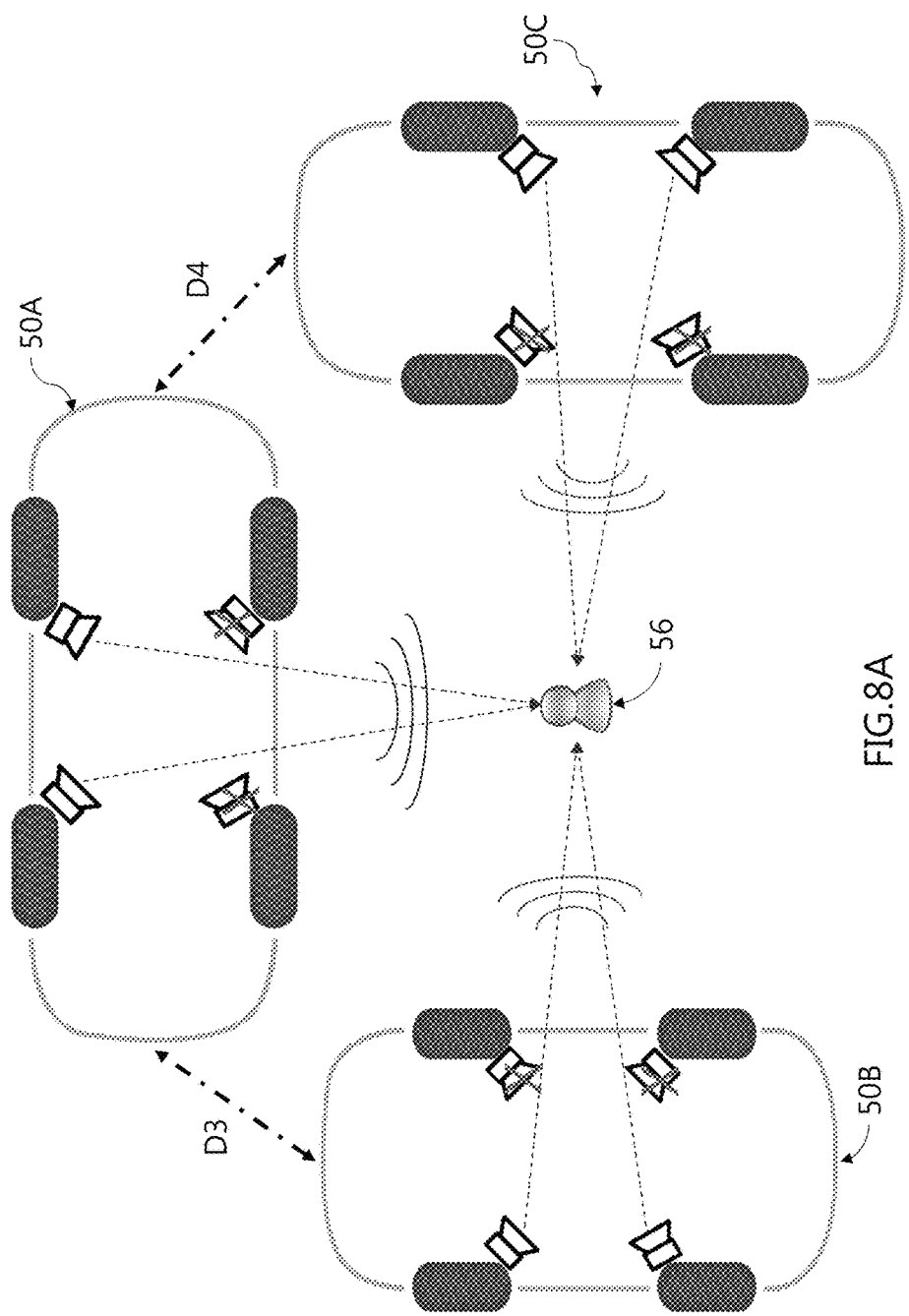
FIGS. 8A to 8C are diagrams for explanation of a method of controlling sound systems installed in a plurality of adjacent vehicles.
Figure 8B:
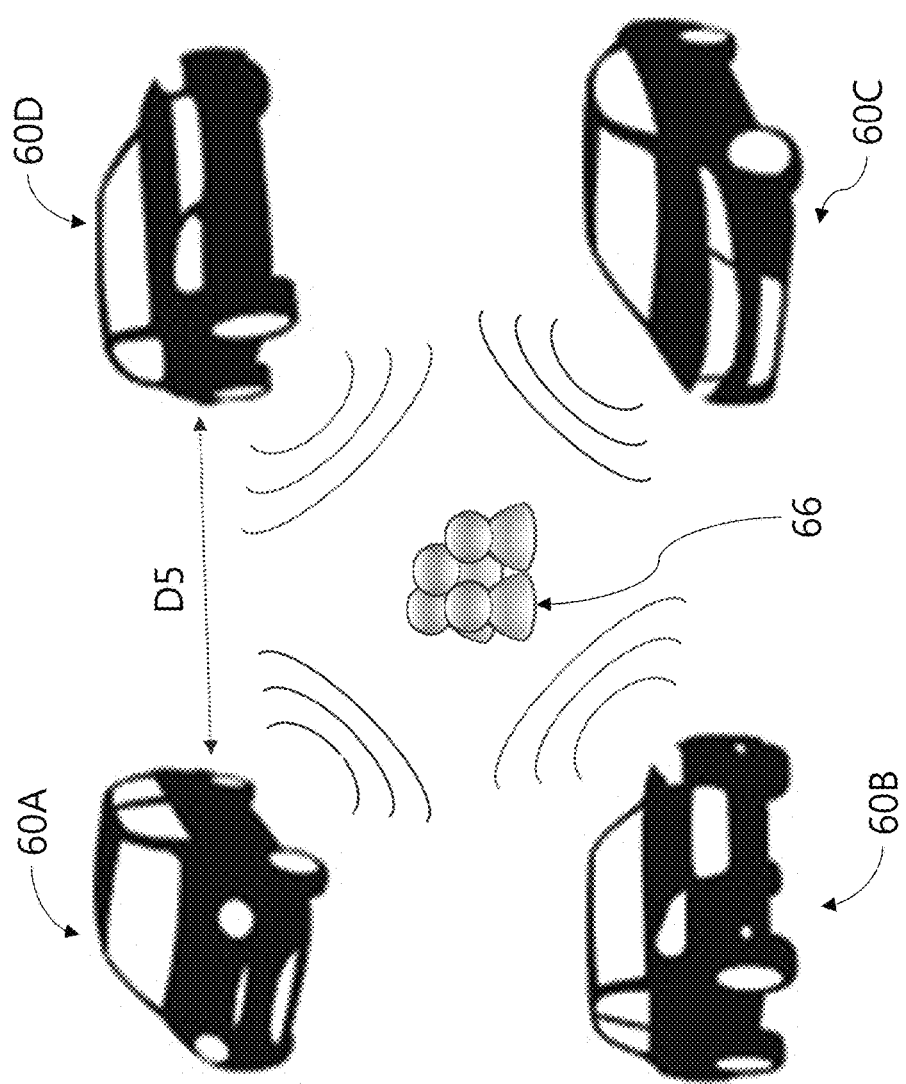
Figure 8C:
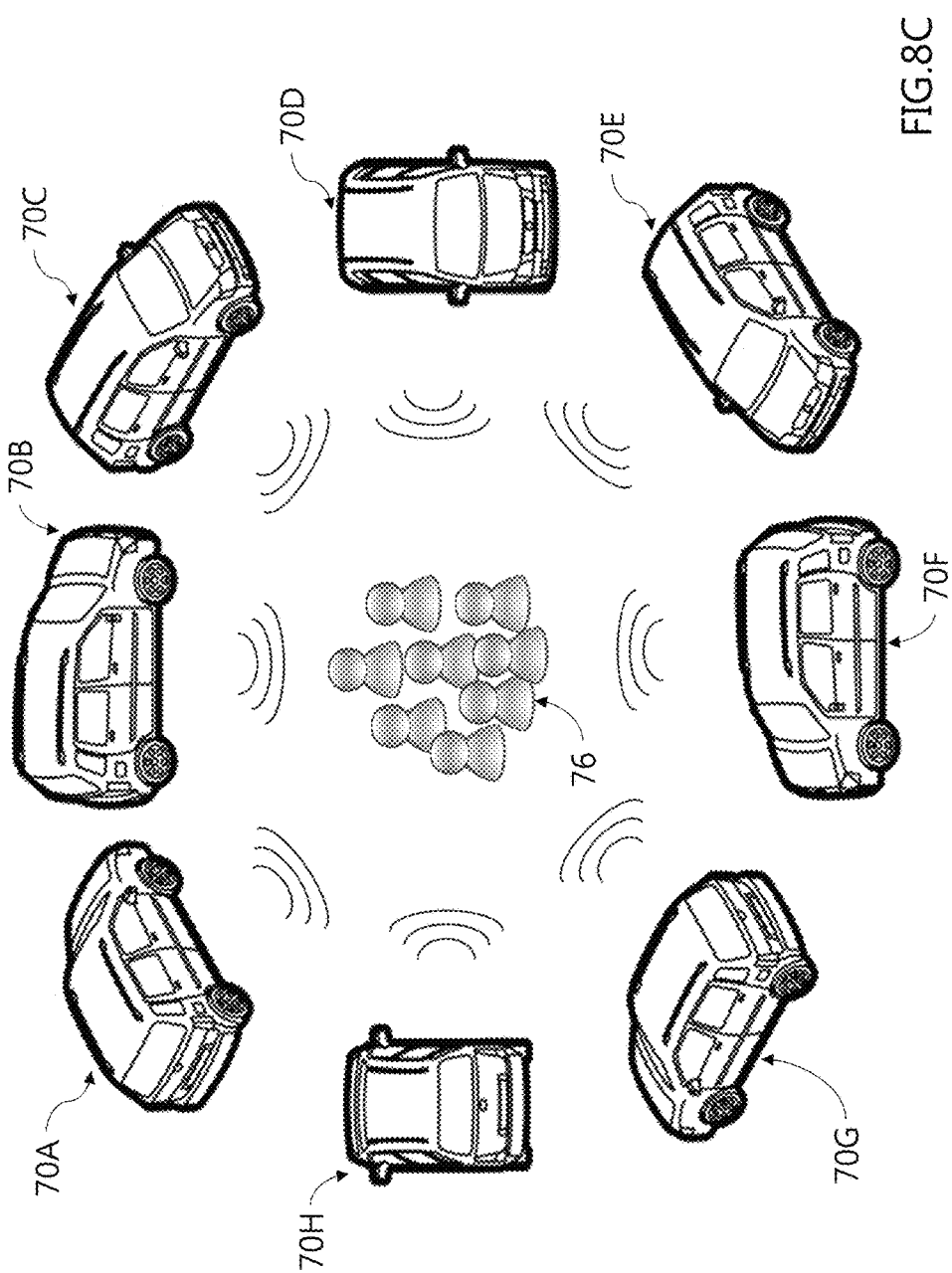

FIGS. 8A to 8C are diagrams for explanation of a method of controlling sound systems installed in a plurality of adjacent vehicles. Referring to FIGS. 8A and 8C, despite presence of two or more vehicles, when relative positions (e.g., a distance between vehicles and an angle between vehicles) between vehicles are input or detected, even if the number of vehicles is increased by n, sound systems installed in each corresponding vehicle may be operatively associated with each other.

Referring to FIG. 8A, sound systems installed in three vehicles 50A, 50B, and 50C may be operatively associated to embody a stereo function. To this end, after position information such as distances D3 and D4 between vehicles and specifications of each vehicle may be collected, a recommended position for optimizing or maximizing a sound effect may be provided to a user 56.

Referring to FIG. 8B, when it is possible to operatively associate four vehicles 60A, 60B, 60C, and 60D with each other and the four vehicles 60A, 60B, 60C, and 60D are arranged in the form of a loop, position information between vehicles may be determined through a distance D5 between vehicles. Sound output by operatively associating sound systems installed in the four vehicles 60A, 60B, 60C, and 60D with each other may be provided to users 66 positioned in a region in which the four vehicles 60A, 60B, 60C, and 60D are arranged in the form of a loop. Here, the plurality of vehicles 60A, 60B, 60C, and 60D may be different vehicle models or available from different manufacturers.

With reference to FIG. 8C, the case in which a plurality of adjacent vehicles 70A, 70B, 70C, 70D, 70E, 70F, 70G, and 70H are operatively associated with each other will be described below. Thereby, users 76 may enjoy a high-quality sound effect using a plurality of sound systems installed in the plurality of adjacent vehicles 70A, 70B, 70C, 70D, 70E, 70F, 70G, and 70H even in a wide area.

Figure 9:
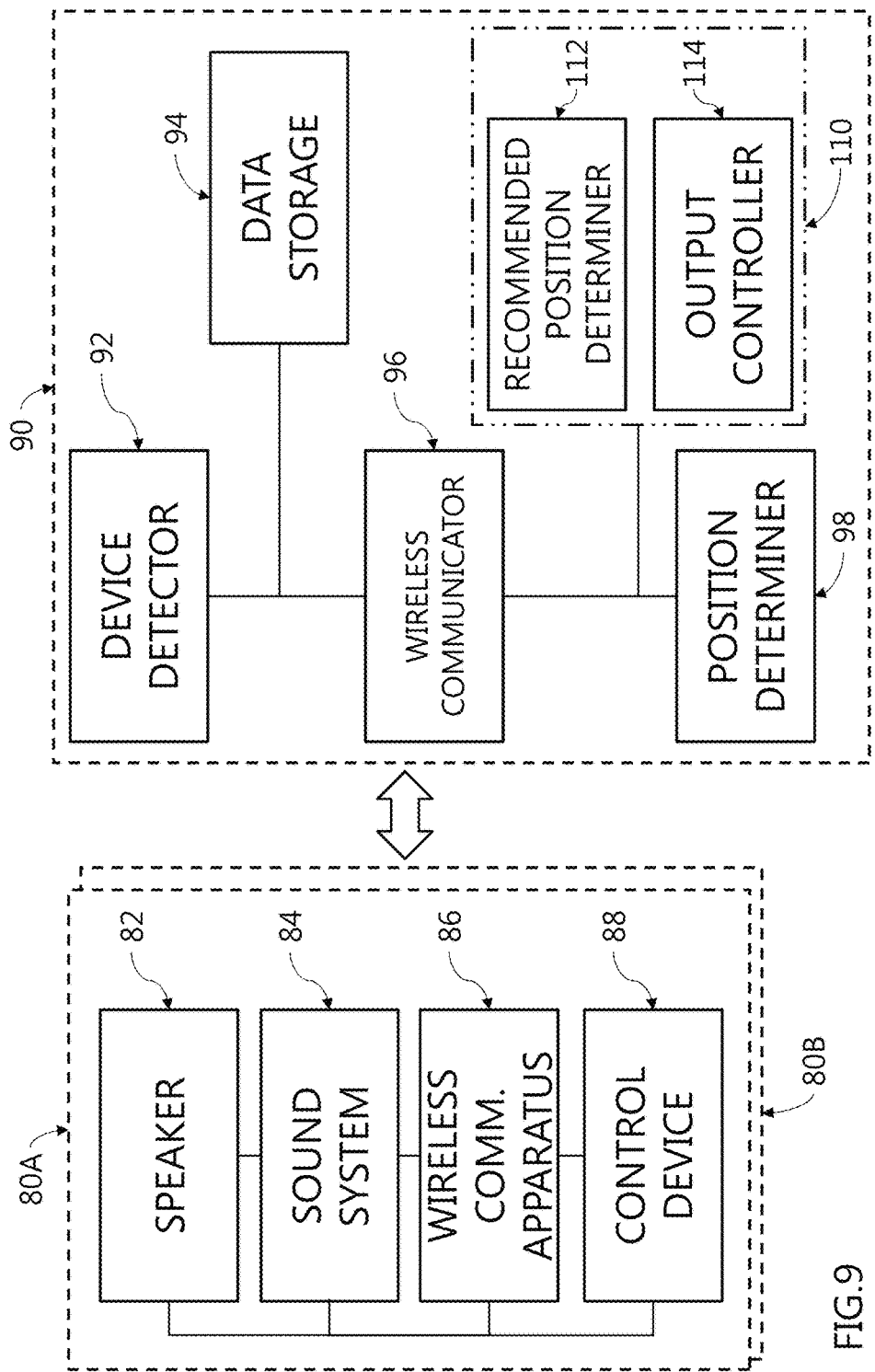
FIG. 9 is a diagram for explanation of an apparatus for controlling sound systems installed in a plurality of vehicles.

FIG. 9 is a diagram for explanation of an apparatus for controlling sound systems installed in a plurality of vehicles.

As illustrated in the drawing, an apparatus 90 for controlling a sound system 84 including a speaker 82 installed in a plurality of vehicles 80A and 80B may include a device detector 92 for recognizing the plurality of sound systems 84 installed in the plurality of vehicles 80A and 80B, respectively, a position determiner 98 for determining relative positions of a plurality of vehicles, and a device controller 110 for controlling operations of the plurality of sound systems according to relative positions and specifications of each of the plurality of vehicles 80A and 80B.

Here, the case in which the apparatus 90 for controlling sound systems installed in a plurality of vehicles is included in an apparatus including a wireless communicator 96 such as a portable terminal and a notebook PC, but not the plurality of vehicles 80A and 80B will be exemplified below. However, in some forms, the apparatus 90 for controlling sound systems installed in a plurality of vehicles may be installed in each of vehicles 80A and 80B and, in this case, may be connected to another vehicle through a wireless communication apparatus installed in a vehicle. In addition, when the apparatus 90 for controlling sound systems installed in a plurality of vehicles is installed in each of the vehicles 80A and 80B, the apparatus 90 may be connected to the sound system 84, the speaker 82, a control device 88, and so on through a communication network in a vehicle.

The device controller 110 may include at least one of a recommended position determiner 112 for determining output recommendation positions of a plurality of sound systems according to relative positions and specifications, and an output controller 114 for adjusting outputs of a plurality of sound systems according to relative positions, specifications, and a user input position. Here, the output recommendation position may be determined as a range with a preset radius and the input position may be determined through a global positioning system (GPS). In addition, relative positions between the plurality of vehicles 80A and 80B may be determined as including a distance between vehicles, an angle between vehicles, an arrangement state, and so on. For example, the position determiner 98 may determine a distance between vehicles based on information collected through a global positioning system (GPS) installed in the plurality of vehicles 80A and 80B or according to user input.

Sound systems installed in the plurality of vehicles 80A and 80B may have various specifications and, accordingly, an apparatus for controlling sound systems installed in a plurality of vehicles may transmit a command for controlling the sound systems. For example, the output controller 114 may generate a control signal for performing at least one operation of volume control and direction adjustment of a speaker installed in the plurality of vehicles 80A and 80B or adjustment of an equalizer, an amplifier, and an echo chamber.

When the apparatus 90 for controlling sound systems installed in a plurality of vehicles is not installed in a vehicle, a plurality of sound systems installed in the plurality of vehicles 80A and 80B may be recognized by the apparatus 90 for controlling sound systems installed in a plurality of vehicles through wireless communication based on at least one of long-range and short-range communication technologies. In addition, the apparatus 90 for controlling sound systems installed in a plurality of vehicles may further include the wireless communicator 96 for performing a preset security procedure with the plurality of vehicles 80A and 80B to acquire operational control of a sound system installed in a vehicle.

The apparatus 90 for controlling sound systems installed in a plurality of vehicles may further include a data storage 94 for storing at least one of arrangement and performance of a sound system according to a vehicle model as specifications of the plurality of vehicles 80A and 80B. Here, the plurality of vehicles 80A and 80B may be different type of vehicles or available from different manufacturers. When information on a vehicle, which is not contained in the data storage 94, is detected, the device controller 110 may request an external server of information on a corresponding vehicle. Thereby, audio apparatuses installed in different types of vehicles or vehicles available from different manufacturers as well as a plurality of sound systems installed in a plurality of the same type of vehicles may be operatively associated with each other.

The device controller 110 may determine one of the plurality of sound systems 84 as a master device and determine others as a slave device. The device controller 110 may stop reproduction of a sound source thereof and output a sound source transmitted from a master device through a speaker. In addition, when at least one of the plurality of vehicles 80A and 80B moves, the device controller 110 may stop control of operations of the plurality of sound systems.

Upon determining that it is difficult to operatively associate the sound systems 84 with each other, the device controller 110 may request movement of at least one of the plurality of vehicles 80A and 80B through a user interface.

The aforementioned apparatus for control of sound systems installed in a plurality of vehicles may change a user interface provided in a vehicle to add an association function with another vehicle so as to satisfy needs of consumers and drivers. In addition, fellowship, similarity, or the like caused between vehicle models for providing an association function may facilitate sales promotion of vehicles.

In addition, when it is not appropriate to control the sound systems installed in a plurality of vehicles, the aforementioned apparatus for control of sound systems installed in a plurality of vehicles may request a user to move at least one of the plurality of vehicles.

The methods according to the aforementioned forms can also be embodied as computer readable code stored on a computer readable recording medium. The computer readable recording medium is any data storage device that can store data which can thereafter be read by a computer. Examples of the computer readable recording medium include read-only memory (ROM), random-access memory (RAM), CD-ROMs, magnetic tapes, floppy disks, optical data storage devices, carrier wave (e.g., transmission via the Internet), etc.

The computer readable recording medium can also be distributed over network coupled computer systems so that the computer readable code is stored and executed in a distributed fashion. In addition, functional programs, codes, and code segments for accomplishing the present features can be easily construed by programmers skilled in the art to which the presently disclosed features pertains.

Those skilled in the art will appreciate that the presently disclosed features may be carried out in other specific ways than those set forth herein without departing from the spirit and essential characteristics of the presently disclosed features.

The above forms are therefore to be construed in all aspects as illustrative and not restrictive. The scope of the presently disclosed features should be determined by the appended claims and their legal equivalents, not by the above description, and all changes coming within the meaning and equivalency range of the appended claims are intended to be embraced therein.

The apparatus according to the forms of the presently disclosed features has the following advantages.

The presently disclosed features may be advantageous to provide an improved sound service to a plurality of users by operatively associating speakers installed in a plurality of vehicles.

The presently disclosed features may be advantageous to enhance productivity of corresponding vehicles and brands for users by operatively associating apparatuses installed in a manufacturer for producing a plurality of types of vehicles or a plurality of brands.

In addition, the presently disclosed features may also be advantageous to provide desired sound of users without a separate audio apparatus even at a position outside a vehicle while users using vehicles are engaged in outdoor activities.

It will be appreciated by persons skilled in the art that that the effects that could be achieved with the presently disclosed features are not limited to what has been particularly described hereinabove and other advantages of the presently disclosed features will be more clearly understood from the following detailed description taken in conjunction with the accompanying drawings.

It will be apparent to those skilled in the art that various modifications and variations can be made in the presently disclosed features without departing from the spirit or scope of the disclosure. Thus, it is intended that the presently disclosed features cover the modifications and variations of this disclosure provided they come within the scope of the appended claims and their equivalents.

What is claimed is:

1. A method of controlling sound systems installed in a plurality of vehicles, the method comprising:
   recognizing a plurality of sound systems respectively installed in a plurality of vehicles;
   determining relative positions of the plurality of vehicles;
   accessing specifications of each of the plurality of vehicles in a data storage;
   when a specification regarding a recognized sound system from the plurality of sound systems is not included in the data storage, requesting an external server for the specification based on information regarding each of the plurality of vehicles; and
   controlling operations of the plurality of sound systems according to the relative positions and the specifications of each of the plurality of vehicles to collectively make a stereo sound outputted from the plurality of sound systems provided in each of the plurality of vehicles.

2. The method according to claim 1, wherein controlling operations of the plurality of sound systems comprises determining output recommendation positions of the plurality of sound systems according to the relative positions and the specifications.

3. The method according to claim 1, wherein controlling operations of the plurality of sound systems comprises adjusting output of the plurality of sound systems according to the relative positions, the specifications, and an input position of a user.

4. An apparatus for controlling sound systems respectively installed in a plurality of vehicles, the apparatus comprising:
   a device detector configured to detect a plurality of sound systems respectively installed in a plurality of vehicles;
   a position locator configured to determine relative positions of the plurality of vehicles;
   a device controller configured to:
      receive specifications of each of the plurality of vehicles; and
      control operations of the plurality of sound systems according to the relative positions and the specifications of each of the plurality of vehicles to collectively make a stereo sound outputted from the plurality of sound systems provided in each of the plurality of vehicles; and
   a data storage configured to store at least one of arrangement or performance information of the plurality of sound systems, wherein the arrangement or the performance information is described in the specifications of each of the plurality of vehicles,
   wherein, when there is no arrangement or performance information regarding a sound system in a detected vehicle in the data storage, the device controller is further configured to request an external server for the arrangement or the performance information regarding the sound system in the detected vehicle.

5. The apparatus according to claim 4, wherein the device controller comprises at least one of:
   a recommended position locator configured to determine output recommendation positions of the plurality of sound systems according to the relative positions of the plurality of vehicles and the specifications of each of the plurality of vehicles; or
   an output controller configured to adjust output of the plurality of sound systems according to the relative positions of the plurality of vehicles, the specifications of each of the plurality of vehicles, and an input position of a user.

6. The apparatus according to claim 5, wherein distances of each of the plurality of vehicles from an output recommendation position in the output recommendation positions are the same.

7. The apparatus according to claim 5, wherein:
a difference in the distances between each of the plurality of vehicles and the output recommendation position is within a preset range; and
the range is determined according to a difference in performances of the plurality of sound systems.

8. The apparatus according to claim 6, wherein:
the output recommendation position is determined as a range with a preset radius; and
the input position is determined through a global positioning system (GPS).

9. The apparatus according to claim 6, wherein the output controller generates a control signal for performing at least one operation of volume control and direction adjustment of a speaker installed in the plurality of vehicles, or adjustment of an equalizer, an amplifier, or an echo chamber.

10. The apparatus according to claim 5, wherein the plurality of sound systems are detected based on at least one of long-range communication technologies or short-range communication technologies, wherein each of the plurality of sound systems further comprise a wireless communicator configured to perform a preset security procedure with the plurality of vehicles to implement operational control of the sound system.

11. The apparatus according to claim 4, wherein:
the relative positions comprise at least one of a distance and an angle between the plurality of vehicles; and
a position determiner determines the distance based on information transmitted from a global positioning system (GPS) installed in the plurality of vehicles or according to a user input.

12. The apparatus according to claim 4, wherein the device controller is further configured to select one of the plurality of sound systems as a master device and select remaining sound systems as slave devices.

13. The apparatus according to claim 12, wherein the device controller is further configured to cease audio output from a current sound source and control audio output from a sound source transmitted from the master device.

14. The apparatus according to claim 4, wherein the device controller is further configured to cease the control of operations of the plurality of sound systems when at least one of the plurality of vehicles is detected to move.

15. The apparatus according to claim 4, wherein the plurality of vehicles are different types of vehicles or available from different manufacturers.

16. The apparatus according to claim 4, wherein a summed output of each of the plurality of sound systems is increased via the operations of the plurality of sound systems.

17. The apparatus according to claim 4, wherein the operations of the plurality of sound systems comprise outputting audio through different audio channels and adjusting reproduction times to produce the stereo sound.

18. The apparatus according to claim 4, wherein the device controller is further configured to recognize a position of a terminal operatively associated with the plurality of sound systems as a set point.

19. The apparatus according to claim 4, further comprising a user interface configured to provide a request for movement of at least one of the plurality of vehicles upon determining difficulty to control the plurality of sound systems according to the relative positions and specifications of each of the plurality of vehicles.

* * * * *